United States Patent
Laxman et al.

(10) Patent No.: US 7,257,110 B2
(45) Date of Patent: Aug. 14, 2007

(54) CALL PROCESSING ARCHITECTURE

(75) Inventors: Amruth Laxman, Boca Raton, FL (US); Jack Bloch, Boca Raton, FL (US); Van Phung, Coral Springs, FL (US); Robert S. Stockdale, Boca Raton, FL (US); Salim Saba, Boca Raton, FL (US); Nicholas Cosmidis, Boynton Beach, FL (US)

(73) Assignee: Siemens Communications, Inc., Boca Raton, FL (US)

( * ) Notice: Subject to any disclaimer, the term of this patent is extended or adjusted under 35 U.S.C. 154(b) by 1131 days.

(21) Appl. No.: 10/261,279

(22) Filed: Sep. 30, 2002

(65) Prior Publication Data

US 2003/0091032 A1    May 15, 2003

Related U.S. Application Data

(60) Provisional application No. 60/325,856, filed on Sep. 28, 2001.

(51) Int. Cl.
*H04L 12/64* (2006.01)

(52) U.S. Cl. .................................................. 370/352
(58) Field of Classification Search ............... 370/352, 370/353, 354, 355, 356
See application file for complete search history.

(56) References Cited

U.S. PATENT DOCUMENTS

| | | | | |
|---|---|---|---|---|
| 6,611,591 | B1 * | 8/2003 | McNiff et al. | 379/268 |
| 6,614,781 | B1 * | 9/2003 | Elliott et al. | 370/352 |
| 2004/0101125 | A1 * | 5/2004 | Graf et al. | 379/229 |

* cited by examiner

*Primary Examiner*—Melvin Marcelo

(57) ABSTRACT

A call processing system includes an access gateway that has a local switching unit. The access gateway, in operation, provides access to voice signals and data signals. The call processing system also includes a call feature server that has a host interface platform configured to connect to the access gateway through a network. The call feature server, in operation, provides call control functionality to the local switching unit. The call feature server is configured to provide bearer control signals through a packet network to establish a bearer channel.

49 Claims, 11 Drawing Sheets

FIG. 8

| DIU240 | | M13 MUX | | MEDIA GATEWAY | |
|---|---|---|---|---|---|
| DIU240 PORTS | # OF T1s | MUX SHELF | MUX # | MEDIA GATEWAY # | IDC PAIR |
| DIU 0 PORTS 1-3²² | 3 | N/A | 1 | N/A | N/A |
| DIU 0 PORT 4-DIU 2 PORT 10 | 27 | 1 | 1 | 1 | 1 |
| DIU 3 PORTS 1-3²³ | 3 | N/A | 2 | N/A | N/A |
| DIU 3 PORT 4-DIU 5 PORT 10 | 27 | 1 | 2 | 1 | 2 |
| DIU 6 PORT 1-DIU 8 PORT 8 | 28 | 2 | 3 | 1 | 3 |
| DIU 8 PORTS 9-10 | 2 | 2 | UNUSED | N/A | N/A |
| DIU 9 PORT 1-DIU 11 PORT 8 | 28 | 2 | 4 | 1 | 4 |
| DIU 11 PORTS 9-10 | 2 | 2 | UNUSED | N/A | N/A |
| DIU 12 PORT 1-DIU 14 PORT 8 | 28 | 3 | 5 | 1 | 5 |
| DIU 14 PORTS 9-10 | 2 | 3 | UNUSED | N/A | N/A |
| DIU 15 PORT 1-DIU 17 PORT 8 | 28 | 3 | 6 | 1 | 6 |
| DIU 17 PORTS 9-10 | 2 | 3 | UNUSED | N/A | N/A |
| DIU 18 PORT 1-DIU 20 PORT 8 | 28 | 4 | 7 | 2 | 7 |
| DIU 20 PORTS 9-10 | 2 | 4 | UNUSED | N/A | N/A |
| DIU 21 PORT 1-DIU 23 PORT 8 | 28 | 4 | 8 | 2 | 8 |
| DIU 23 PORTS 9-10 | 2 | 4 | UNUSED | N/A | N/A |
| MAXIMUMS → | 222 | 4 | 8 | 2 | 8 |

CALL PROCESSING ARCHITECTURE

PRIORITY AND INCORPORATION OF OTHER APPLICATIONS

This application claims priority from U.S. Provisional Application No. 60/325,856, filed Sep. 28, 2001, and entitled METHOD AND APPARATUS FOR INTEGRATING TDM SWITCHING INTO A TELECOMMUNICATIONS SYSTEM THAT USES ATM AND CES.

This application is also related to the following U.S. patent applications: U.S. patent application Ser. No. 10/108,603 filed Mar. 28, 2002 entitled DISTRIBUTED ARCHITECTURE FOR A TELECOMMUNICATIONS SYSTEM; U.S. patent application Ser. No. 10/159,210 filed May 30, 2002 entitled AN INTEGRATED ACCESS PLATFORM, the contents of each of said applications being incorporated by reference herein in their entirety.

BACKGROUND

A traditional voice telephone network typically includes a circuit-switched network to establish communications between a sender and a receiver. The circuit-switched network is a type of network in which a communication circuit (path) for a call is set-up and dedicated to the participants in that call. For the duration of the connection, all resources on that circuit are unavailable for other users. An Electronic Worldwide Switch Digital (EWSD) is a widely-installed telephonic switch system. Common Channel Signaling System No. 7 (i.e., SS7 or C7) is a global standard for telecommunications defined by the International Telecommunication Union (ITU) Telecommunication Standardization Sector (ITU-T). The standard defines the procedures and protocol by which network elements in the public switched telephone network (PSTN) exchange information over a digital signaling network to effect wireless (cellular) and wireline call setup, routing and control.

A softswitch is a software-based entity that provides call control functionality. The various elements that make a softswitch architecture network include a call agent, which is also known as a media gateway controller or softswitch. The network also includes a media gateway, a signaling gateway, a feature server, an applications server, a media server, and management, provisioning and billing interfaces.

The softswitch architecture does not replace an SS7 architecture. For example, when a person wants to setup a call from one location to another location, the person picks up the phone at one location and dials a series of numbers. A local switch recognizes the call as a long distance call, which is then forwarded to a long haul exchange where it is recognized as an out of state call. Then, the call is transferred to a national gateway for the other location. The call makes a hop to an intermediate gateway, which is located somewhere between the two locations, and finally the call goes through two or three switches before it connects to a local switch associated with the number. The role of SS7, which does not use traditional trunks, is to ensure, prior to actually setting up the call, there is a clear path from end to end. Only when there is sufficient resources is the call set-up.

The major difference between a softswitch architecture and a traditional architecture is that the call is not required to pass through as many smaller switches. Today, when the person makes a trunk call the person uses the whole trunk even though a smaller portion of the available bandwidth is required. On the other hand, with a softswitch architecture, an Internet protocol (IP) connection between the gateways of the two locations is established and a switching fabric between the two locations is in the form of fiber optic lines or other form of trunk. There is no need to reserve trunks and set-up is not required. One only has to reserve the bandwidth that the call will need.

SUMMARY

The inventions discussed below relate to a call processing approach that provides a distributed, open architecture telecommunications environment for addressing the needs of carriers and service providers in converging voice and data networks.

In one aspect, the invention is a call processing system. The call processing system includes an access gateway that has a local switching unit. The access gateway, in operation, provides access to voice signals and data signals. The call processing system also includes a call feature server that has a host interface platform configured to connect to the access gateway through a network. The call feature server, in operation, provides call control functionality to the local switching unit. The call feature server is configured to provide bearer control signals through a packet network to establish a bearer channel.

This aspect may have one or more of the following features. The access gateway includes a media gateway to convert time division multiplex (TDM) signals to a packet compatible format and the media gateway provides bearer channel transport to the local switching unit. The local switching unit (LSU) includes an access control platform (ACP) and a local switching unit (LSU) remote interface (RTI) interfacing the ACP with bearer signals and control signals. The local switching unit includes an access line frame (ALF) interfacing the ACP with bearer signals and control signals. The access gateway includes an integrated access platform providing a GR303 interface and the integrated access platform interfaces the ACP with bearer and control signals.

The host interface platform includes a first subplatform that has a first interface processor card and a first T1 card and a second subplatform that has a second interface processor card and a second T1 card. The second subplatform is redundant to the first subplatform.

The network includes a time division multiplex (TDM) network. The network includes the packet network. The packet network includes an asynchronous transfer mode (ATM) network.

The access gateway includes a first ATM edge switch that connects the local switching unit to the network to receive control signals from the call feature server. The first ATM edge switch performs circuit emulation of control signals and routing of bearer channels. The system of claim 10 wherein the call feature server includes a second ATM edge switch that connects the host interface platform to the network. The second ATM edge switch performs circuit emulation of control signals in tandem with the first ATM edge switch. The packet network includes an Internet Protocol (IP) network.

The access gateway includes a first multiplexer connecting local switching unit to the network to receive control signals from the call feature server. The first multiplexer performs circuit emulation of control signals and routs of bearer channels.

The call feature server includes a second multiplexer that connects the host interface platform to the network. The multiplexer performing circuit emulation of control signals in tandem with the first multiplexer.

Components of the access gateway are accessible through a web browser. The system includes a plurality of access gateways. The media gateway provides bearer channel transport to each of the plurality of access gateways. Each access gateway has a corresponding media gateway.

In another aspect, the invention is a method of call processing. The method includes connecting a network to a call feature server having a host interface platform, connecting the network to an access gateway having a local switching unit and receiving a request to route a call from the access gateway. The method also includes sending a control signal from the call feature server to the local switching unit to route the call and sending a bearer channel control signal to establish a bearer channel.

This aspect may include one or more of the following features. Sending a bearer control signal includes sending the bearer control signal from the call feature server. Sending a bearer control signal includes sending the bearer control signal from the access gateway. The network includes a packet based network. The network is an ATM network. The network includes an IP network. The access gateway includes a media gateway that is capable of converting a time division multiplex messages to packet-based messages.

In still another aspect the invention is a call feature server for a call processing system. The server includes a centralized controller to send control signals to a plurality of distributed processors, a local area network (LAN) to couple the centralized controller to each of the plurality of distributed processors to perform decentralized call processing, and a host interface platform connecting the LAN to a network to send control signals and bearer signals, the host interface platform configured to interface with a packet network.

This aspect may have one or more of the following features. The call feature server includes an access gateway connected to the host interface platform via the network. The host interface platform includes a first subplatform having a first interface processor card and a first T1 card. The host interface platform further includes a second subplatform that has a second interface processor card and a second T1 card. The second subplatform is redundant to the first subplatform. The network includes a time division multiplex (TDM) network. The network includes an asynchronous transfer mode (ATM) network. The access includes a first ATM edge switch that connects the local switching unit to the network to receive control signals from the call feature server. The first ATM edge switch performs circuit emulation of control signals and routes bearer channels. The call feature server includes a second ATM edge switch that connects the host interface platform to the network, the second ATM edge switch performing circuit emulation of control signals in tandem with the first ATM edge switch. The network includes an Internet Protocol (IP) network.

The access gateway includes a first multiplexer that connects a local switching unit to the network to receive control signals from the call feature server. The first multiplexer performs circuit emulation of control signals and routs bearer channels. The call feature server includes a second multiplexer that connects the host interface platform to the network. The multiplexer performs circuit emulation of control signals in tandem with the first multiplexer.

In another aspect, the invention is a method of call processing. The method includes receiving a request to route a call, sending control signals via a host interface platform through a network to set-up the call and sending bearer control signals.

In a still further aspect, the invention is an access gateway for a call processing system. The gateway includes a local switching unit to set-up a call, a media gateway capable of TDM signal and packet message conversion, the media gateway receiving control signals from a network, the media gateway providing bearer control signals to the local switching unit from a call feature server, and a multiplexer to perform circuit emulation of TDM signals from the network.

In another aspect the invention is a method of call processing. The method includes receiving a request to route a call, converting time division multiplex (TDM) signals to a packet compatible format, sending the request via a packet network to a call feature server and receiving control signals via the packet network from the call feature server to route the call.

In another aspect, the invention is a call processing architecture. The architecture includes a first platform that has a call feature controller. The call feature server is configured to provide bearer control a packet network. The architecture also includes a second platform that has an access gateway connected to the call feature controller via the network. The access gate way includes a media gateway that provides TDM and packet based conversion. The first platform and the second platform each are configured to support an IP network, an ATM network and a TDM network.

This aspect has one or more of the following features. The call processing architecture includes access gateways. The media gateway provides to each access gateway, bear channel transport. Each access gateway has a media gateway interfacing to the network.

The system architecture is particularly well suited in allowing the high quality and variety of voice services of real-time voice networks to be transferred to data networks, and conversely enables IP applications to be used in the voice network. The open architecture is fully scaleable and offers flexibility by supporting existing legacy systems, while allowing the introduction of newer call feature services. Thus, the system architecture is packet based, but the architecture supports expansion to accommodate legacy TDM interfaces and networks.

DESCRIPTION OF THE DRAWINGS

FIG. 8 is a mapping table for a digital interface unit, a M13 multiplexer and the access gateway.

DETAILED DESCRIPTION

Figure 1:
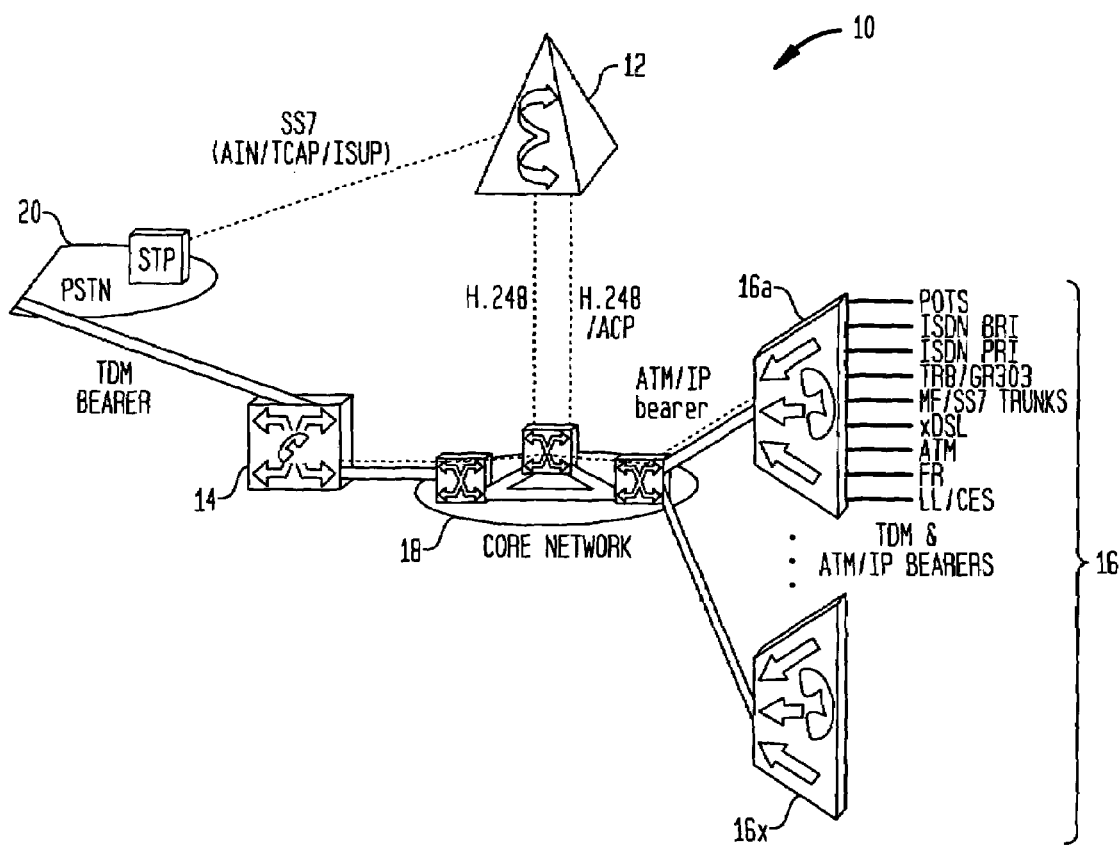
FIG. 1 is a block diagram of a multiservice switch architecture.

Referring to FIG. 1, a multiservice switch (MS) architecture 10 includes a softswitch controller 12 for providing signaling and control functions, a trunk gateway 14 for providing trunk gateway functions, and an access gateway 16 for providing line access functions. Softswitch controller 12, trunk gateway 14 and access gateway 16 are networked together with a core network 18 to provide services that include multi-media, data and voice. Multiservice architecture 10 is configurable for use with different types of networks including packet-based networks. Thus, core network 18 can be in the form of an Internet protocol (IP) network or an asynchronous transfer mode (ATM) network. The core network is used to transport control signals as well as the actual bearer channels. This description relates to a core network 18 having an ATM network. Architecture 10 is also configurable to support networks having a time division multiplex (TDM) network to accommodate users who are not ready to transition to packet-based networks.

Softswitch controller 12 provides control inter-working between public-switched telephone network (PSTN) 20 and core network 18 having a packet-based network, and implements voice services and feature transparency between PSTN and packet networks. Softswitch controller 12 also provides call control and inter-working for access gateways 16, for calls within the access gateway, between access gateways and between access gateways and PSTN/Packet Network 20. Since softswitch controller 12 interfaces different media, the softswitch controller uses different protocols. For example, softswitch controller 12 uses a Media Gateway Control Protocol (MGCP), an ITU-T (International Telecommunications Protocol) H.323 protocol, Bearer-Independent Call Control (BICC), Remote Authorization Dial-In User Service (RADIUS) protocol and SS7. MGCP is used by softswitch controller 12 to centrally control voice over packet gateways and network access servers. The ITU-T H.323 protocol is a set of signaling protocols for the support of voice or multimedia communication within a packet based network (e.g., IP networks). The ITU-T H.323 protocol covers the protocols necessary for operation and for interconnection with circuit switched networks. In this embodiment, BICC is the protocol used between softswitch controller 12 to exchange local information regarding call setup. RADIUS is the standardized protocol for Internet access control. SS7 is the world-wide standard for common channel signaling in the network.

Trunk gateway 14 bridges the gap between packet-based networks and PSTN 20. Trunk gateway 14 is controlled by softswitch controller 12 and provides the media stream conversion between a time division multiplex (TDM) network and Internet Protocol (IP) or from an asynchronous transfer mode (ATM) network.

Access gateway 16 provides access technologies from existing Plain Old Telephone Service/integrated Services Digital Network (POTS)/(ISDN) to generic Digital Subscriber Lines (xDSL) and other broadband services such as Frame Relay ATM as well as Voice over IP (VoIP) access gateways. To facilitate this flexibility, access gateway 16 includes a media gateway 110 (FIG. 7) that converts packet messages into TDM messages. Thus, media gateway 110 provides TDM to ATM conversion for the speech trunks that originate from access gateway 16. Media gateway 110 is a standard ATM media Gateway that supports DS3 input and ATM output and uses the media gateway control (MEGACO) protocol for media gateway control.

Unlike a traditional switching architecture consisting of signaling and call control, trunk access, line access and a switching fabric all residing in one box, MS architecture 10 provides all the same functions found in a traditional architecture, as well as others, but distributes these functions over a network. Softswitch controller 12 performs the signaling and controlling functions, access platform 16 and gateway 14 functionally perform the trunk/line access and packet network 18 performs the function of the switching fabric. In architecture 10, softswitch controller 12 can be thousands miles away from access gateway 16 but still can provide call feature functionality via network 18 to the access gateway.

In the embodiment shown in FIG. 1, softswitch controller 12 can support up to twenty-four access gateways 16. Access gateway 16a can be routed to other access gateways, for example access gateway 16x, through network 18.

In operation, when a call is received by access gateway 16a, a request is sent by access gateway 16a to softswitch 12 to connect the call. Softswitch controller 12 sends a routing control signal to access gateway 16a and access gateway 16x to set-up a call. In other words, the endpoints of the call are established by the softswitch controller 12. In some implementations, there could be a number of intermediate media gateways between access gateway 16a and access gateway 16x. Softswitch controller 12 also sends bearer control signals to the intermediate media gateways along the path of the call. In other embodiments, bearer control is established by the access gateways along the signal path. In still other embodiments, a single media gateway is used to support all access gateways to provide TDM-to-packet conversion.

Many factors are considered when developing the system architecture for softswitch controller 12. One of the most important factors which drives softswitch controller 12 development is the requirement that the softswitch controller support the full Class 5 feature set. To accomplish this goal, full advantage is taken of the existing, very stable Digital Switching System (EWSD) feature software. This re-use has the immediate advantage that the required features are already available in a tested, stable environment. Therefore, softswitch controller 12 fits within the framework that allows for the development of a platform which has minimal impact on the required feature set. An additional factor to consider is the rate at which technology is constantly improving and evolving. Any server architecture which is developed therefore, will use commercially available platforms (where possible) so that significant improvements in throughput and capacity may be realized by upgrading the platforms as the improved technology becomes available. Lastly, the call model and capacity issues are incorporated into the architecture design.

I. Softswitch Controller

Figure 2:
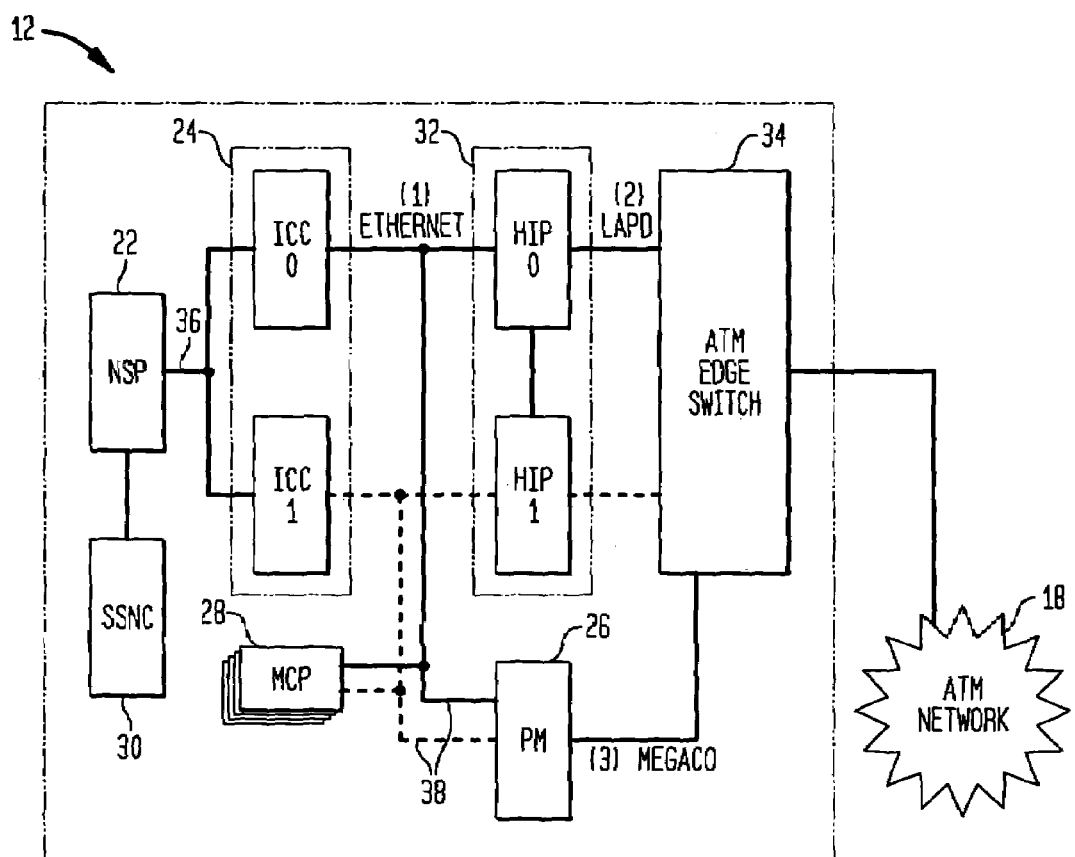
FIG. 2 is block diagram of the softswitch of FIG. 1 having a host interface platform.

Referring to FIG. 2, softswitch controller 12 has nine functional parts, namely, a Network Services Processor (NSP) 22, an Inter-Connect Controller (ICC) 24, a Packet Manager (PM) 26, a set of distributed Media Control Platforms (MCPs) 28, an Integrated Signaling Gateway (ISG) often referred to as a Signaling System Network Control (SSNC) 30, a host interface platform 32, an ATM edge switch 34 and lastly, a connection medium which allows all of the functional blocks to communicate with one another. The connection medium is split into two entities, namely, a first connection 36 between NSP 22 and ICC 24 and a second connection 38 between ICC 24, distributed MCP platforms 28 and host interface platform 32.

In this embodiment, softswitch controller 12 supports as many as 4,000,000 busy hour call attempts (BHCA). However, for the purposes of call model calculation, architecture 10 can support up to 250,000 trunks. When a mean holding time of 180 s/call is used for 250,000 trunks (125,000 incoming and 125,000 outgoing) this equates to 2,500,000 BHCA (or 695 calls/s).

A. Common Media

First connection 36 between NSP 22 and ICC 24 is an 8-bit serial interface (proprietary) which mimics an input/output processor: message buffer (IOP:MB) to Message Buffer interface. This interface is completely realized in the hardware (HW). Second connection 38 is between ICC 24 and the system periphery (MCP 28, PM 26, SSNC 30 and host interface platform 32). This connection uses a Fast Ethernet (100 MB/S) LAN segment. The EWSD HW-based addressing algorithm is converted to a standard IP-based addressing scheme.

B. SSNC Overview

SSNC 30 performs the signaling gateway functionality. SSNC 30 is a multi-processor system consisting of a single shelf (minimum configuration) of HW. SSNC 30 is its own system with its own maintenance devices disks and optical devices. It is "loosely coupled" to NSP 22 via an ATM link and to the local area network. This link is mainly used to synchronize database states between the two platforms, and to transfer SS7 orders between the other softswitch controller components and SSNC 30. SSNC 30 performs the task of terminating the SS7 from the network and converting the signaling into server-compatible messaging. SSNC 30 further controls the routing of messages to NSP 22 or media control tasks (MCTs) and to access control platforms (ACPs) 114 (FIG. 7) on access gateways 16, i.e., SSNC 30 acts as SS7 signaling interface for access gateways as well. Further, SSNC 30 will route SS7 messages from softswitch controller 12 to the network. SSNC 30 terminates pure SS7 links. In other embodiments, the SS7 links will be replaced by stream control transmission protocol (SCTP) associations. SSNC 30 consists of the following HW: a main processor: Stand Alone (MP:SA), an ATM Multiplexer (AMX), an ATM central clock generator (ACCG), an alarm indicator (ALI), link interface circuit (LIC), along with associated small computer system interface (SCSI) disks and optical drives. The MP:SA is the system master and performs the control functionality such as operations, administration and maintenance (OA&M), loading, for example. The AMX provides the connectivity between system pieces, i.e., allowing all of the units to communicate with one another via a proprietary asynchronous transfer mode (ATM) protocol called an internal transport protocol (ITP). The MP:DEP performs a signaling link termination (SLT) functionality and performs SS7 handling. The ACCG is the source of the system clock. The ALI provides the alarm interface for the system. Additionally, it provides the interface for the radio clock reference signal (i.e., network reference). The LICs provide the termination for the SS7 links. In other embodiments, the LICs are replaced by MP:DEP-E (Ethernet) for Stream Control Transmission Protocol (SCTP) termination.

C. PM Overview

PM 26 provides the communication interface between the softswitch controller 12 and media gateways 110 connected to it via network 18. PM 26 also provides a bearer control interface for the media gateways connected to the access gateways 16. The PM 26 supports MGCP or MEGACO gateway interfaces, and voice over ATM (VoATM) or voice over IP (VoIP) call control. The PM can also transport SS7 BICC signaling between softswitch controller 12 and another media gateway controller. Connection of PM 26 to softswitch controller 12 is done via redundant Ethernet paths on the LAN. PM 26 is an external device which is not fully integrated into server architecture 20. PM 26 is totally decoupled from softswitch controller 12 as far as any recovery, configuration, or maintenance strategy.

There is a form of loose coupling which is realized by a periodic message sent from NSP 22 to PM 26 via each redundant LAN segment. PM 26 responds to this message on each LAN side. The purpose of this messaging is two-fold in that it first serves to inform NSP 22 that PM 26 is still available and second, the message from NSP 22 to PM 26 contains the active LAN side so that PM 26 knows which LAN side to use when transmitting to NSP 22 and/or any other peripheral platform.

D. NSP Overview

NSP 22 is realized using the hardware of the EWSD CP113E. The hardware is robust, stable, fault tolerant and provides a "ready-made" environment to ensure that the feature rich EWSD call processing software will run without problems. The hardware consists of standard EWSD CP113E HW up to and including the input/output (I/O) interfaces. This includes base processors (BAP), call processors (CAP), common memory (CMY), bus for CMY (B:CMY), input/output controllers (IOCs) and input/output processors (IOPs) and the existing storage media (MDD) is supported as well.

Figure 7:
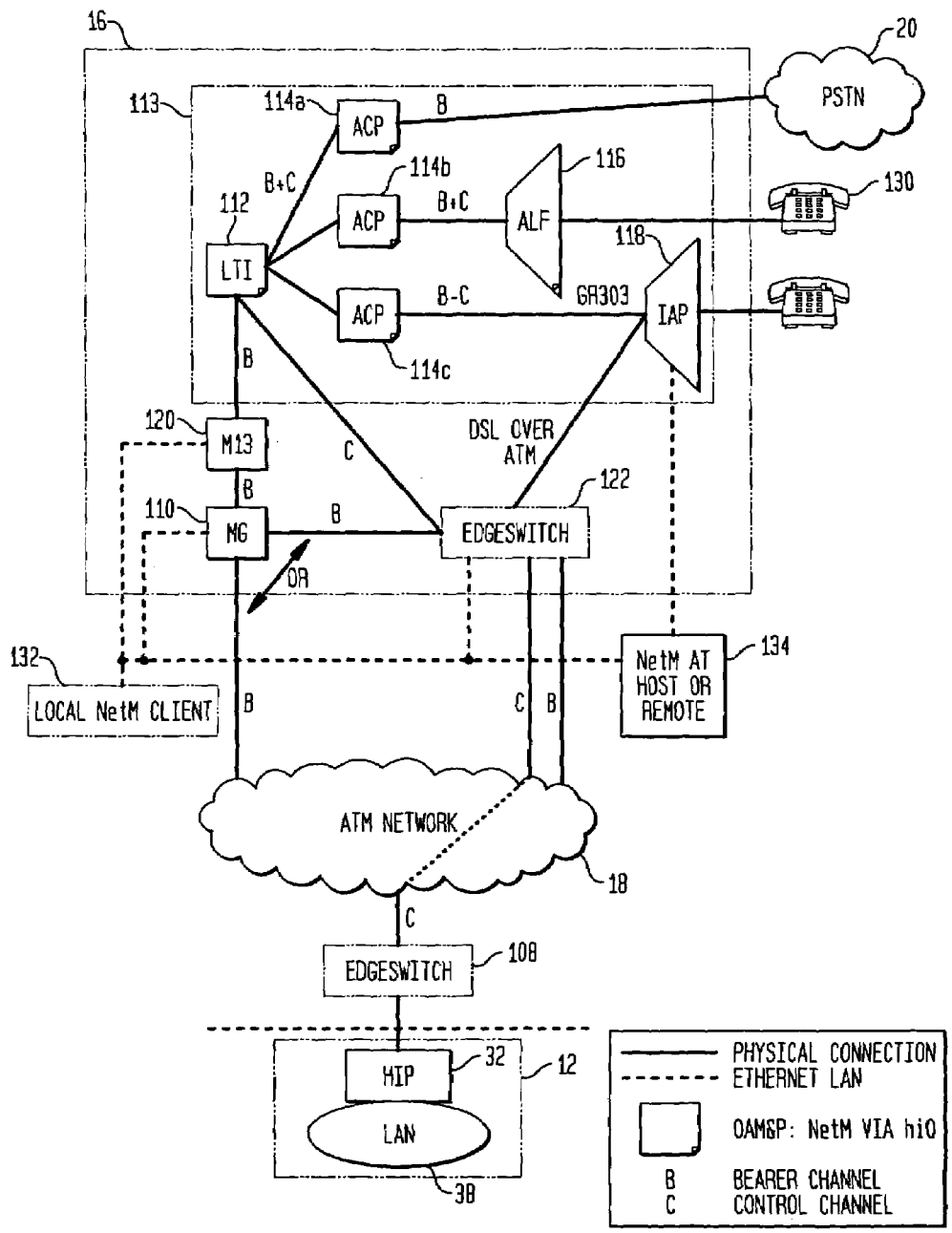
FIG. 7 is a block diagram of the access gateway used with the ATM core network.

The role of NSP 22 is to provide the feature/Call processing process (CALLP) database. NSP 22 also performs the loading of necessary data to the distributed MCPs 28 and perform those coordinated functions necessary to keep the system operational (e.g., maintenance, recovery, administration, alarming, etc.). NSP 22 also provides OA&M for local switching unit (LSU) 113, ACPs 114 and a access line frame (ALFs) 116 (FIG. 7). All of the necessary functionality exists and can be re-used with a minimum set of changes (as opposed to a re-implementation). One further advantage of this re-use is the fact that all of the existing operations support systems (OSS) can be supported.

E. ICC Overview

Figure 3:
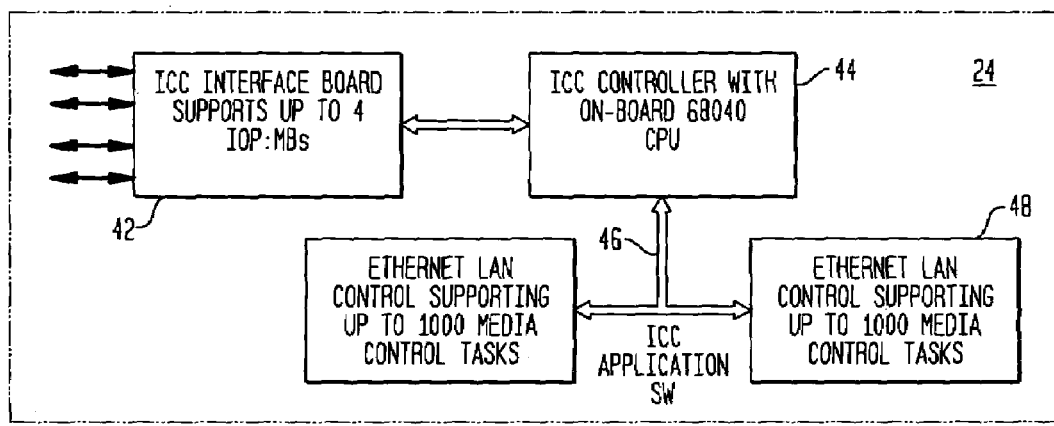
FIG. 3 is a block diagram of a inter-connect controller (ICC) of FIG. 2.

Referring to FIG. 3, ICC 24 is a multifunctional unit. ICC 24 provides a bi-directional interface between NSP 22 and the distributed platforms 28, PM 26, host interface platforms 32 and signaling gateway 30. In addition to providing the interface, it provides the protocol conversion between standard EWSD messaging (i.e., message buffer unit/message channel (MBU/MCH) based addressing) and Ethernet Media Access Control (MAC) addressing (discussed in detail below), since the actual platform interconnect will be provided via fast Ethernet (100 MB/s internal local area network (LAN) segment(s)). ICC 24 handles the routine test interface from NSP 22. This is necessary to satisfy the hardware/software (HW/SW) interface which requires the functional buffering/switching devices (switching network (SN) and message buffer (MB) from the EWSD architecture) to be present. ICC 24 also supervises the LAN interface (i.e., reflect the connection status of all components connected to the LAN), to detect any LAN faults and report any faults to NSP 22.

In other embodiments, the devices communicate with one another directly and ICC 24 merely monitors each device and informs the other devices of any status changes.

The ICC 24 has the following functional blocks. An interface board 42 is a pure HW component which addresses the signaling interface between CP113C IOP:MB, an 8-bit parallel interface, and ICC 24. Interface board 42 connects directly with a controller board 44 which acts as a multiplexer. One controller board 44 supports up to eight interface connections and therefore by extension, eight IOP:MB interfaces. If additional IOP:MB interfaces are supported, for example, up to 7 are required to support 4,000,000 BHCA, then this is accomplished by adding interface boards 42 (which support up to 4 interfaces) and/or controller boards 44.

The next functional block is the application SW 46 itself. Application SW 46 communicates with the controller board via Direct Memory Access (DMA) (bi-directionally), so that NSP messages may be received and sent. Lastly, a LAN controller 48 provides the actual interface to MCPs 28, PM 26, Host interface platforms 32, and Signaling Gateway 30. The application entity therefore provides the bi-directional connection path between NSP 22 format messages and the Ethernet messages.

The ICC HW is realized by using a standard slot based 500 MHZ Pentium III CPU slotted into a passive backplane. The Interface card HW 42 requires a standard Industry Standard Architecture (ISA) connection, while the Controller HW 44 uses a peripheral component interconnect (PCI) slot. The LAN controller(s) 48 also use standard PCI interfaces.

F. ICC HW

Softswitch controller 12 development ICC 24 is a PC based system. It converts NSP 22 I/O system (IOP:MB) to the PCI-BUS standard which is used in a PC environment. Generic PC-boards can be used to further process NSP 22 data and send it via a network interface card (NIC) to LAN 38 which connects all units involved in the data exchange.

ICC 24 is housed in rack mountable case that holds the different PC-boards to assemble ICC 24 functionality. To ensure redundancy, two ICCs 24 are used. To connect both the ICC with NSP 22, the SPS frame is required. The SPS frame contains converter boards and the necessary cables to hook up the ICC with NSP 22.

There are two ICCs 24 each housed in 4U case with 12 slot passive backplane. Each ICC 24 contains one Slot CPU, two NICs, two switching periphery simulator B board (SPSB) controller boards, two switching periphery simulator C board (SPSC) interface board, two switching periphery simulator D board (SPSD) port board, one SPS frame is with four switching periphery simulator E board (SPSE) converter boards.

In other embodiments, each ICC 24 contains one Slot CPU, one network interface card (NIC), one switching periphery simulator B board (SPSB) controller board, one SPSC interface board, one SPSD port board, one SPS frame with two SPSE converter boards.

The Slot CPU with a Pentium III, 1 GHz runs the control SW under Windows98/Linux. A 512 Mbyte system memory is used to execute the SW applications.

The LAN board (NIC) is the interface to the LAN which enables communication with the PM/PCU and the MCPs. This network interface card is a commercial board which holds its own CPU. An intelligent server adapter suitable for this embodiment is the PRO/100 manufactured by Intel. The onboard CPU takes over a lot of load balancing and LAN maintenance tasks which will free up the PC-CPU for more important duties.

The controller board (SPSB) communicates with the PC SW via bus master DMA and with NSP 22 via the interface boards. The controller board contains a MP68040 with 25 Mhz bus clock, an interface to the PC memory using DMA via PCI bus, a 32-bit interface to the outside of the PC realized with a 37-pin sub-d connector (IO-PORT) for testing and controlling purpose, an interrupt input for the MP68040 (one pin of the 37-pin sub-d connector), a clock, reset, grant, address and data bus to four SPSC boards where the SPSB can control up to four SPSC which allows the connection of sixteen IOP:MB interfaces, a 256 Kbyte RAM, no wait state access, and a 256 Kbyte Flash memory (2 wait state access which holds the FW for the 68040 CPU).

The interface board (SPSC) has a connection with NSP 22. The board includes four interfaces to IOP:MB, two interfaces are accessible via 26-pin high density sub-d connector located on SPSC board. The other two interfaces need to be connected via two 26-pin ribbon cables with the SPSD board. The board also includes a counter for central time stamp with a resolution of 1 microsecond.

One board holds four IOP:MB interfaces which will be sufficient for up to 60 k trunks. If more trunks are needed another interface board is added so that 250 k trunks can be supported.

Port board (SPSD) serves as a port to the outside since only two 26 high density (HD) sub-d connectors fit on board SPSC. The SPSC however allows the connection of four IOP:MB and therefore the missing two connectors are placed onto SPSD. SPSD holds only passive components, two connectors for two 26 pin ribbon cables and two 26 HD sub-d connectors.

SPS FRAME (SPSSF) is mounted in the ICC rack and holds up to 4 converter boards (SPSE) which translate up to sixteen IOP:MB interface signals to/from TTL/bipolar. All necessary cables are connected between IOP:MBs, SPSSF and ICC 24 which creates a compact device.

CABLE (B) connects one IOP:MB interface of the ICC, with the SPS frame (SPSSF). It plugs via 1-SU SIPAC connector into the SPSSF back plane and with a 26-pin SUB-D connector into one IOP:MB interface on the ICC. The SPSSF feeds the signals from cable (B) to SPSE which is used to exchange data/control information between the ICC and the IOP:MB.

CABLE (X) is a Standard cable between IOP:MB and MB. This cable has a 1-SU SIPAC connector on both sides and connects the SPSSF with the IOP:MB.

Figure 4:
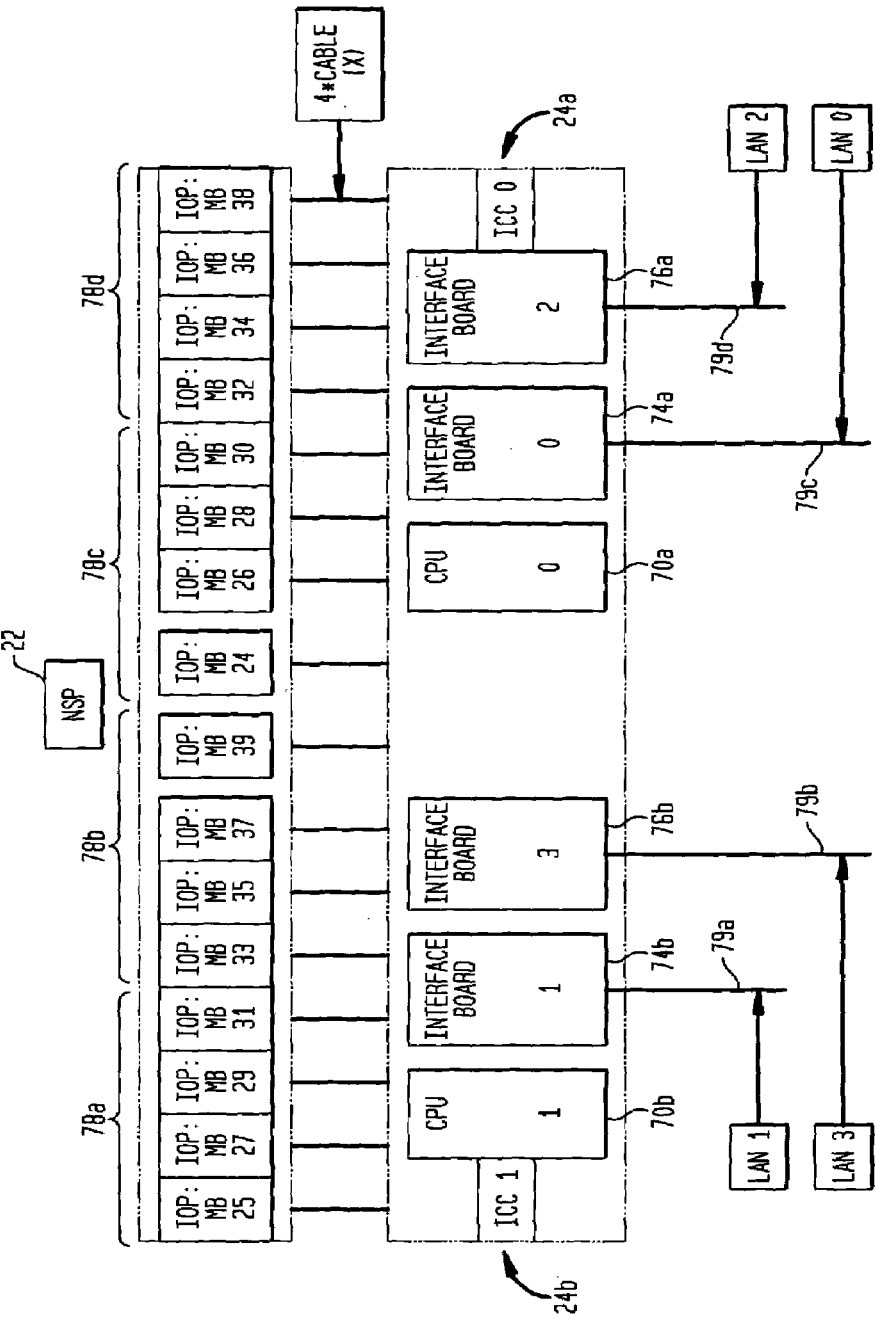
FIG. 4 is a block diagram of an interconnection between a interconnect controller and a network services processor.

Referring to FIG. 4, each ICC 24*a* and 24*b* is a compact PCI (CPCI) based system. It includes a generic CPU board with Intel Pentium III CPU 70*a* and 70*b* with 1 Ghz, 512 Mbyte Memory and up to two interface boards 74*a-b* and 76*a-b* for connecting with NSP 22. The two ICCs 24*a* and 24*b* are housed in one shelf with compact PCI back plane. Two Interface boards connect up to four IOP:MB from NSP 22 and one 100Base-Tx Ethernet port. For example, board 74*a* connects to IOP:MB 78*c* and port 79*c*; board 76*a* connects to IOP:MB 78*d* and port 79*d*; board 74*b* connects to IOP:MB 78*a* and port 79*a*: and board 76*b* connects to IOP:MB 78*b* and port 79*b*.

G. Local Area Network Components

Figure 5:
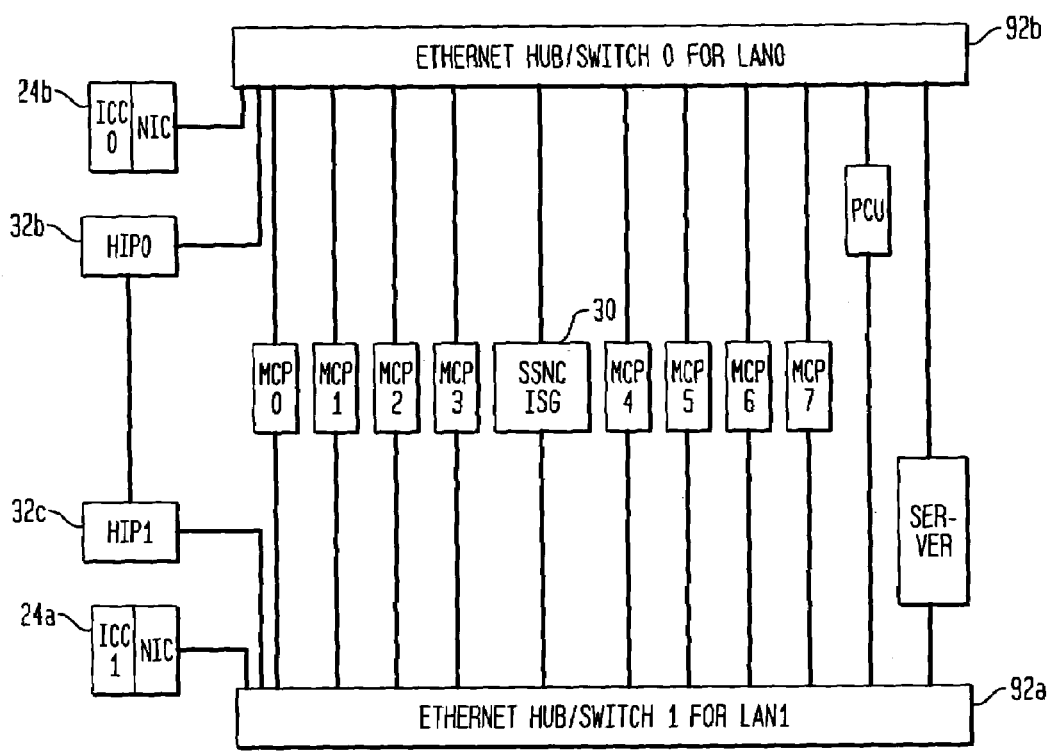
FIG. 5 is a block diagram of local area network (LAN) components.

Referring to FIG. 5, LANs O/I are 100Base-TX Ethernet that interconnect all system components. Two 100Base-TX Ethernet Switches 92*a* and 92*b* are used for each ICC 24*a* and 24*b* to connect all units via LAN. The two LAN segments support the bandwidth between the ICC and MCP 28. There are at least 23 units hooked up to one LAN segment (ICC, PM/PCU, eight MCPs, a Router for OAM&P (not shown), and SSNC). For redundancy reasons, four independent LAN segments are employed. (Two for side0 and two for side1).

FIG. 5 depicts the MCP configuration with the maximum number of eight MCPs without an access gateway 16. With the introduction of access gateway 16, the maximum number of MCPs allowed in the system changes. A minimum of 2 MCPs is required on each softswitch controller (with or without access gateway 16). However, if an access gateway

16 is required, then the maximum number of MCPs is reduced by 2 to 6. This is because a minimum of 2 MCPs worth of ACPs (124 ACPs) is reserved for remote ACPs on access gateway 16. If more than 124 remote ACPs are required, then the maximum number of MCPs is further reduced to 4, allowing 248 remote ACPs.

H. MCP Overview

Figure 6:
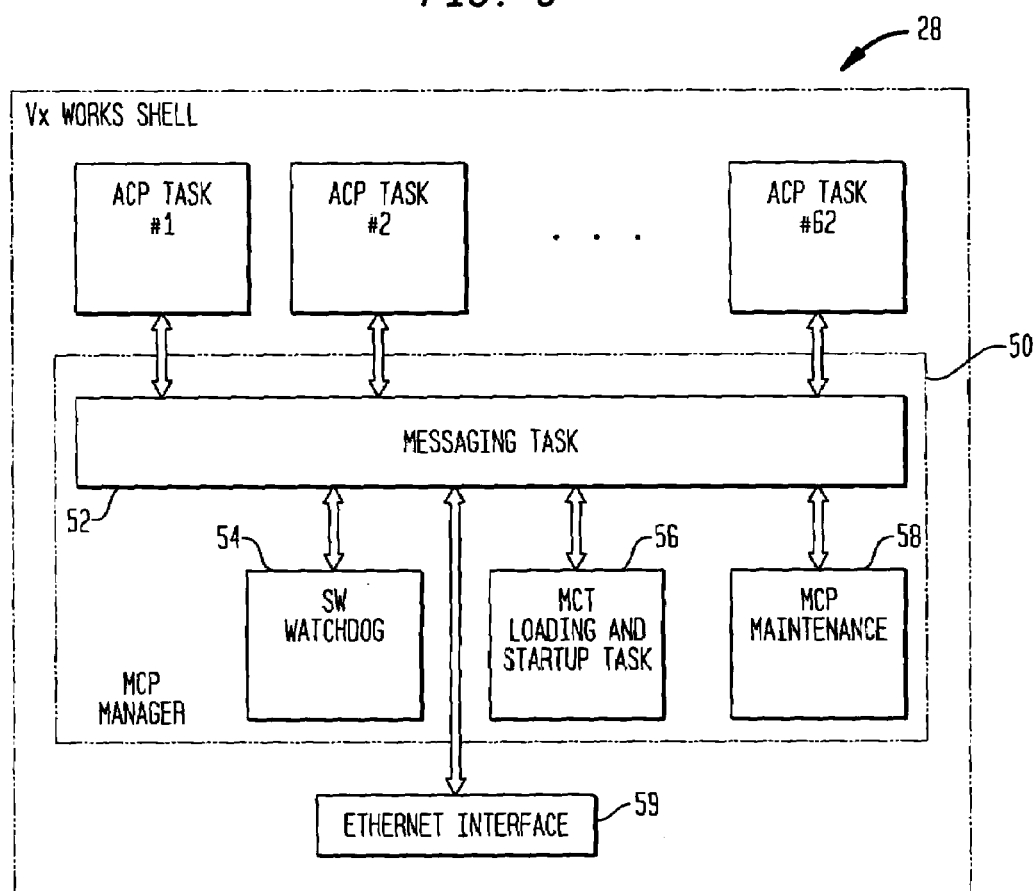
FIG. 6 is a block diagram of media control platform (MCP).

Referring to FIG. 6, MCP 28 consists of a slot based central processing unit (CPU) (e.g., Pentium III 500 MHZ or better) in a backplane. MCP 28 provides a platform for media control functions, which work with the software in NSP 22 to provide media control features. MCP Software is divided into the following two functions: Media Control Functions and MCP Manager Functions 50. Each MCP 28 supports up to 62 Media Control Tasks (MCTs) running simultaneously under a real-time operating system (VxWorks). Each MCT is an independent call-processing entity. EWSD Access control platform (ACP) software is reused extensively to provide the MCT function.

MCP Manager Functions 50 are distributed across a messaging task 52, software watchdog task 4, a MCT Loading & Startup Task 56, and a MCP maintenance task 58.

Messaging task 52 is multi-functional. It provides the interface to the Ethernet for communication between all tasks on MCP 28 and NSP 22 or other distributed platforms. Messaging task 52 also provides an interface with ICC 24 for maintenance of the LAN and the message channels associated with the Media Control Tasks.

SW Watchdog task 54 monitors all MCP tasks to ensure that each task is running correctly. MCT Loading & Startup Task 56 provides an interface to NSP 22 for loading of MCT software. MCT Loading & Startup Task 56 manages and manipulates the context associated with each MCT, and generates each MCT task in its correct context. MCP Maintenance Task 58 performs general maintenance functions on MCP 28, including handling reset requests from NSP 22, routine test and audit functions, utilities and processing firmware upgrades. MCP Manager Functions are further explained below.

I. MCP Hardware Configuration

MCP 28 replaces the existing ACP hardware and software. MCP 28 supports 62 Virtual ACP images under control of a commercial Operating System (i.e., VxWorks) along with the necessary messaging and support tasks. The MCP hardware requirements will support WM requirements and US.

The Media Control Processor (MCP) hardware and operating system is based on commercially available products. The overriding requirement for the hardware is that it be (US) Central Office ready or NEBS Level 3 compliant. The key components are the MCP Processor Board, Ethernet Switch, Chassis/Backplane, and Rack.

Figure 10:
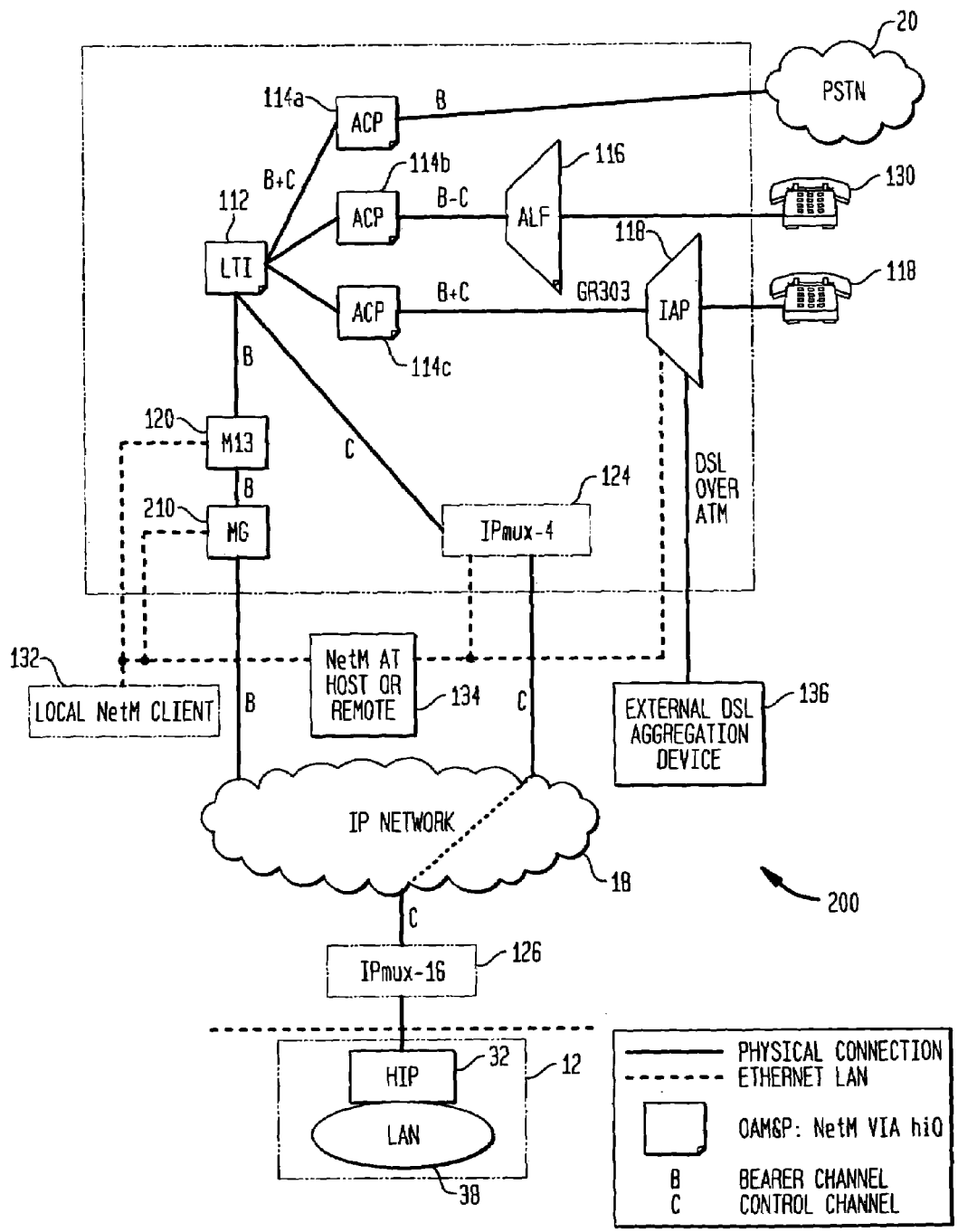
FIG. 10 is a block diagram of a second example of the access gateway with an IP network.
Figure 11:
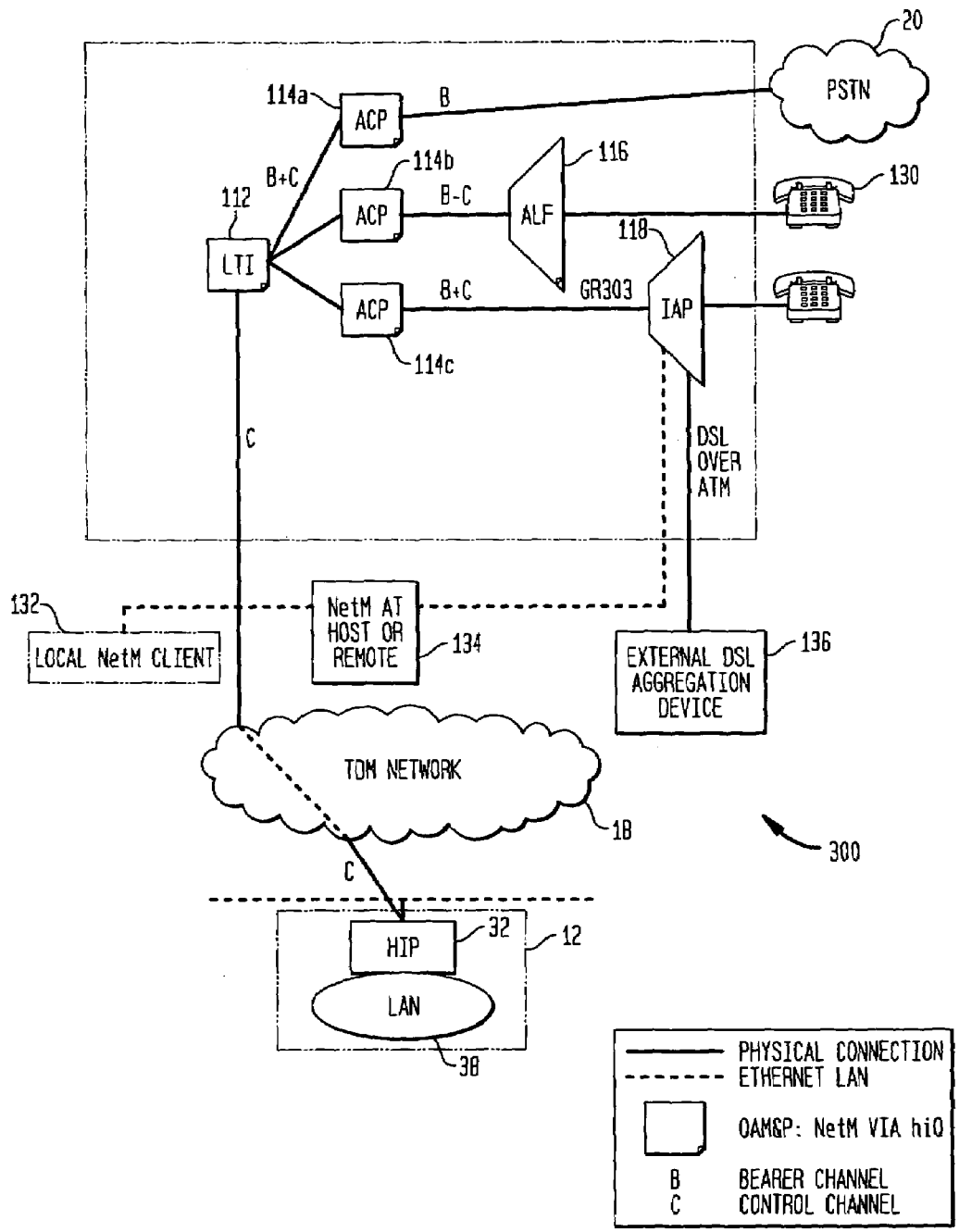
FIG. 11 is a block diagram of a third example of the access gateway with a TDM core network.

Referring to FIGS. 10 and 11, the R1.0 minimum MCP shelf configuration has four 5-slot enclosures, one redundant pair of MCPs 28a and 28b, and two Ethernet switches (for sides 0 & 1) 92a and 92b. The R1.0 maximum MCP shelf Configuration has four 5-slot enclosures, four redundant pairs of MCPs 28a-h or eight MCPs and two Ethernet switches (for sides 0 & 1) 92a and 92b.

1. MCP Processor Board

The MCP Processor Board plugs into a passive Backplane. It receives power and the board location (shelf/slot) from the Backplane, and all connectivity and communications is achieved through the Ethernet ports. Alternatively a Backplane Ethernet bus is used. The processor on the board is a x86 because the ported code is in Intel assembly language.

The processor board (PB) is a single computing board (SBC) platform, single slot computer platform. The processor board has the following characteristic. The PB Size fits into a chassis that fits into an EWSD Innovations Rack (BW Type B). The PB pitch size or width is used for calculating the estimated heat dissipation, approximately 1 mm of pitch/1 watt. Boards are hot swappable. The boards have a Intel (x86) processor and Cache size: Minimum size 256K at full speed.

PB has a high performance CPU/Bus/Memory having a CPU >500 MHz core frequency, 133 MHz system bus frequency and a high speed SDRAM (e.g., 10 ns). The Memory size is 768 Mbytes to 1 Gbytes, in expandable steps.

PB has error detection and correction for memory. PB has flash memory size of at least 32 Mbytes used as a boot source (i.e., no hard disk) and is field upgradeable. Other features include, a HW watch-dog (2-stage: Stage 1—Soft, Stage 2—Hard), a HW Timer (1 ms; 100 ms granularity), BIOS Support; Boot from Flash (including board test and diagnostics), Hard or Soft Reset Capability, Real-time OS Board Support Available (e.g., VxWorks), low power dissipation less than 20 Watts and MTBF greater than 10,000 FIT (MTBF less than 11 years), and backward compatibility for next generation boards, (i.e., pin compatibility, reuse of existing shelf).

The SBC External Interface features include 2×10/100 Mbit/s Ethernet interfaces (i.e., dual Ethernet ports integrated on processor board), Cabling with rear accessible Interfaces, debug interfaces with Front access (e.g., RS232, USB), board status visual indicators (Front Access, red/green LED's), and board reset push button (Front Access).

2. Ethernet Switch Board

An Ethernet Switch is required over the use of a hub. The traffic (synchronization issue) requirements will begin to saturate the fast Ethernet when 500 ACPs are supported. When more than 2,000 ACPs are supported, the switch becomes more important. The Ethernet Switch Board is an off-the shelf cPCI product.

The Ethernet Switch Board Type has a self-learning feature and 24 ports with 10/100 Mbits each. 16 ports are connected via cabling (rear connection, e.g., RJ 45) with the 16 processor boards and 8 ports are connected via connectors (rear connection, e.g., RJ 45) for inter shelf connection. The Ethernet board also has hot swappable boards, power dissipation for a single slot board greater than 20 watts for a double slot board is less than 40 watts and MTBF less than 10,000 FIT (MTBF greater than 11 years).

3. Chassis/Backplane

The Shelf (Chassis) includes a Backplane and Power Supply. The shelf or chassis will house the SBCs, Power supplies, and the Ethernet Switch board, and will be mounted in a rack. The Shelf Power Supply Type has redundant power supply (−60; −48 V) for 16 Pro+2 Switch Boards per shelf, N+1 redundancy, hot swappable power supply boards, and MTBF less than 10,000 FIT (MTBF greater than 11 years).

The Shelf and Backplane Type is packaged has having $\geq 16$ processor boards+2 Switch Boards+Power supply in one shelf. The Backplane is split for repair and replacement, a split Backplane solution will double the power supplies required for redundancy. The Backplane has Shelf and Slot indication readable by the SBC for location identification.

The rack supports four shelves or greater per rack (7 ft rack), EWSD-mod rack size BW-B Rack, and has a rack power dissipation less than 3.5 kW.

The following section describes the Shelf/Backplane and Rack, Single Computing Boards, and Building Practices required for the system. The Shelf/Backplane provides power, a shelf and slot identifier, and pass environmental test as required by users (i.e., NEBS Certification). In order to support redundancy, repair, and upgrade procedures the Backplane is split. It is possible to remove a faulty Backplane for repair without losing any stable calls in the system. Redundant Power Supplies are required for fault, upgrade, and repair situations.

A minimum of four shelves fit into the Rack and the alarms and fuses are integrated into the Rack. The fans contribute heat dissipation and are incorporated into the shelf/rack configuration. The Backplane/Shelf combination supports a minimum of 16 processor boards, redundant power supplies, and an Ethernet Switch. Cabling is done at the rear of the shelf. The rack suitable for this embodiment is manufactured by Innovations Rack (BW Type B).

J. Host Interface Platform.

Host interface platform 32 acts as a bridge between LAN in softswitch controller 12 and access gateway 16. Host interface platform 32 performs communication adaptation between Ethernet & external access gateway communication protocols such as LAPD, communication maintenance of softswitch controller 12 and access gateway 16 links e.g., report failure/restoral of the external communication interfaces, aggregate such state changes, provide a barrier between internal LAN and un-protected external network. Host interface platform also provides routing of messages between access gateway components (i.e., ACPs 114) and between Access Gateways.

The host interface platform has two independent processor cards. Each processor is responsible for the communication that occurs on a single LAN side. Host interface platform can support communication to up to 24 access gateways 16 and associated remote access control platforms (ACPs) 114. Host interface platform 32 supports 248 remote ACPs 114. Host interface platforms 32 communicate with each other via a cross-link on the LAN switch. This link is used to route messages in the event that an access gateway is only connected to one Host interface platform (due to failure of communication) but needs to talk to another access gateway that is connected to the other host interface platform].

Host interface platform 32 is based on the compact PCI ICC platform, and includes a Pentium III class cPCI CPU board with dual on-board 100 Base-TX Ethernet ports and 512 MB RAM, cPCI Interface Processor (IFP) card to control the Ethernet ports and up to 3 cPCI T1 cards to terminate LAPD communication from access gateway 16s.

K. ATM Edge Switch

An ATM Edge Switch 108 provides connectivity between softswitch controller 12 and the ATM network. ATM Edge Switch 108 provides Circuit Emulation services for transport of the Access Gateway Control channels between softswitch controller 12 and its access gateways.

II. Access Gateway

Referring to FIG. 7, access gateway 16 is based on the LSU Remote Interface (LTI) platform 112, but consists of several additional components such as a access control platform (ACP) 114, a access line frame (ALF) 116, an integrated access platform 118, a M13 multiplexer 120, an ATM edge switch 122 and media gateway 110. In FIG. 7, bearer channel are designated with a "B" and control channels are designated with a "C"

A. Local Switching Unit (LSU) Remote Interface (LTI)

LTI platform 112 includes several hardware components that work together to provide timeslot switching and control functionality. LTI platform 112 has two external interfaces—interfaces to ACPs 114 and interfaces to network 18.

The ACP interface consists of 8 Mb/s (switched digital carrier) SDC connections that transport speech, as well as a single timeslot of control information transported using HDLC (the ACP message channel).

The network interface includes pulse code modulation (PCM) spans that transport speech (to media gateway 110) or control information over LAPD (to softswitch controller 12).

A single LTI can support up to 240 PCM spans, and up to 70 ACPs. Six PCM spans are used for communication between LTI 52 and host softswitch controller 12, consequently the maximum number of bearer spans available is 234.

The LTI components includes a local switching unit controller (LSUC) module (not shown), a message handler (not shown), a time slot interchange matrix (TSIM) (not shown), an access multiplexer (AMUX) (not shown), and a digital interface unit 240 (DIU240) (not shown).

LSUC module of the LTI consists of an Intel 486 based processor board and additional LAPD communication hardware. The main functions of the LSUC include managing the other LTI components, providing interfaces with the softswitch controller's NSP 22 for maintenance and call switching, managing the ACP and LTI communication to softswitch controller 12, and routing calls when operating in a standalone service mode. There is a single LSUC module per LTI plane.

The message handler uses the same hardware platform as the LSUC module. It provides a bridge between the ACP HDLC interface and the softswitch controller-media gateway LAPD interface. The message handler performs all Layer-2 functions for HDLC & LAPD, as well as proper routing of messages within the LTI and between the ACPs and softswitch controller 12. Each MH can support up to 16 ACP channels. A maximum of 7 Message Handlers is supported per LTI plane.

TSIM is the time switch of the LTI. It provides physical timeslot switching capability between a given pair of time slots. It is controlled by the LSUC. There is a single TSIM module per LTI plane.

The AMUX provides the time slot interface to the TSIM. Each component of the LTI is connected to an AMUX, which is then connected to the TSIM. This simplifies the inter-connection of the various components and speech highways. A minimum of 1 AMUX is required per LTI plane. Additional AMUXs are needed as more components (message handlers, DIUs etc.) are added.

Digital Interface Unit 240 (DIU240) provides PCM connectivity to the network. A single DIU240 can support up to 10 PCM 24 spans. A minimum of two DIU240s is required per LTI (DIU0 and DIU4). A maximum of twenty-four DIU240s can be supported on LTI 112.

B. Access Control Platform (ACP)

ACP 114 is an existing EWSD component that provides Line and Trunk interfaces. Each ACP can support ALF 116, GR-303 or One-Up interfaces for subscriber lines. Multifrequency (MF) Trunks, SS7 Trunks or PRI links can also be supported. From 2-70 ACPs (in pairs for redundancy) can be supported on LTI 112.

C. Access Line Frame (ALF)

ALF 116 is an existing EWSD component that provides physical connectivity for subscriber lines 130. ALF 116 interfaces with ACP 114*b* to connect a bearer channel and a control channel. ALF 116 can be co-located with access gateway 16 or it can be placed at a remote location. Remote access using SLC96 from a co-located ALF 116 is also supported. Variants of ALF can also be used to provide DSL access (using the Packet Hub).

D. Integrated Access Platform

Integrated access platform 118, another access line frame, is optional based on a user's needs. Integrated access platform 118 provides a GR303 interface into ACP 114*c* for the transport of Call Control signaling. Integrated access platform 118 provides line types such as POTS (ground start and loop start) and xDSL (ADSL, SDSL).

E. Media Gateway

Media gateway 110 provides TDM to ATM conversion for the speech trunks that originate from access gateway 16. It is a standard ATM Media Gateway, with DS3 input and ATM output. Media gateway 110 uses the MEGACO protocol for media gateway control. Media gateway is a Voice over ATM gateway unit. It is used for converting the voice media streams from the LTI into ATM. Media gateway 110 includes six redundant pairs of DS3 cards which can be equipped per shelf. This configuration provides for a total of 3,492 DS0s per media gateway. Two media gateway 110 can supports the maximum ATM port count in softswitch controller 12, which can support the maximum of 5,328 ATM trunks. Media gateway 110 supports call control via H.248. Media gateway 110 can be managed via a Web-based interface or via an SNMP interface.

F. M13 Multiplexer (M13 Mux)

M13 Mux 120 is used to concentrate PCM 24 interfaces from the LTI into DS3 interfaces for media gateway 110. Any standard M13 Multiplexer can be used for this function. The output links from the LTI's DIU240 cards are T1 links and the input links on media gateway 110 are DS3s. M13 120 provides for the mapping of DS0s between these two parts of softswitch controller 12.

Referring to FIG. 8 shows the mapping of the T1 ports on the DIU240*s* to M13 mux 120 and then to the media gateway IDC pair. The mapping includes the following assumptions. First each LTI shelf has its assigned pair of muxes. Second, each mux has three DIU240*s* assigned to it, providing for a determined point of impact due to failures. Third, there is same cabling for all LTI extension shelves. Fourth, there is a unified growth path, with each additional LTI shelf paired with a new mux shelf. This in turn is mapped on media gateway 110 with two additional pairs of IDC cards.

G. ATM Edge Switch

ATM Edge Switch 122 provides connectivity between access gateway 16 and ATM network 18. ATM Edge Switch 122 provides standard ATM transport, as well as circuit emulation services (CES) for transport of the LTI LAPD communication channels to softswitch controller 12. ATM edge switch 122 works in tandem with ATM edge switch 108.

H. Network Management

Various components of access gateway 16 can be managed via a local client 132 or a host or remote 134. The components that can be managed are media gateway 110, M13 mux 120, ATM edge switch 122 and integrated access platform 118.

III. Call Processing

Figure 9:
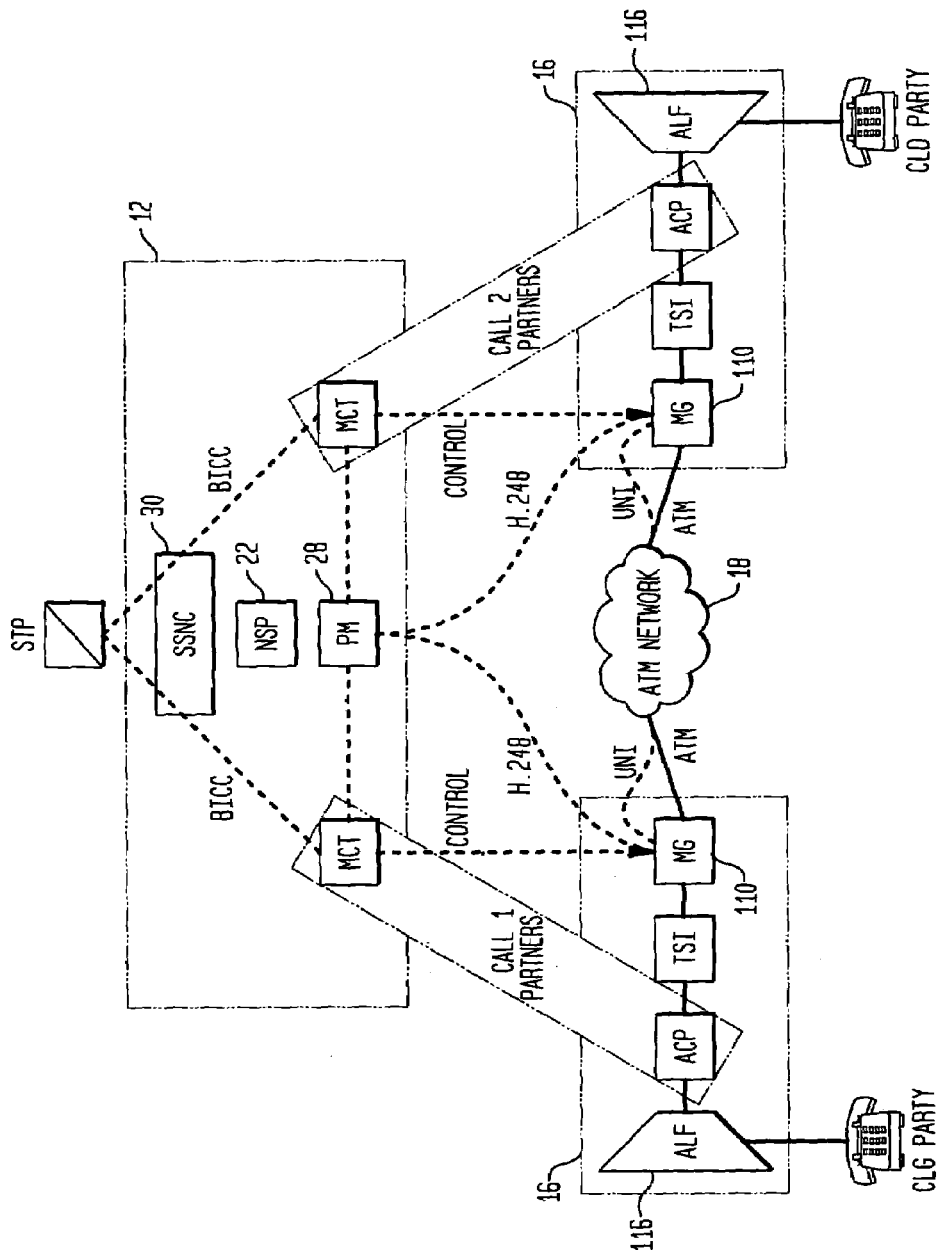
FIG. 9 is a diagram for call processing.

Referring to FIG. 9, each access gateway is its own mini-switch. A call between subscribers on the same access gateway is switched local to that access gateway via the TSI switching matrix. A call between two access gateways (or between a access gateway and an media gateway 110), regardless of whether they are controlled by the same softswitch controller 12 or different softswitch controller 12, is processed as a call to a different switch. should be removed to avoid confusion].

A call within an access gateway 16 can be terminated in 3 different types of destinations: within the same gateway, to another access gateway, or to a packet trunk gateway that provides an interface to the PSTN or another soft switch controller 12. Access gateway requests call routing from the softswitch controller 12 over the control channels. Softswitch controller 12 determines the appropriate end-point of the call and signals the responsible access gateway components (ACPs) or softswitch controller components (MCTs). Finally, the bearer path is setup either within the Access Gateway or between the access gateway and the eventual end-point, using media gateways.

IV. System Redundancy

Softswitch controller 12 is a fully redundant, fault-tolerant system. NSP 22 is realized using the CP113C HW from the existing EWSD configuration. The ICC/LAN redundancy is realized due to the fact that two copies of each exist (side 0 and side 1). A failure of one unit automatically causes a switchover to the secondary unit (without any service interruption). The LAN itself uses a "productive redundancy" concept. This means that both LAN sides are active but each carries half the traffic (this is accomplished with no additional development effort by using the standard ACP message channel distribution (i.e., each task has a different default active/standby side). If a LAN failure occurs, the switchover causes the remaining LAN to carry the full traffic load. MCP 28 itself is not a redundant platform, however, since the MCT SW supports redundancy, it is possible to make each MCT redundant. This is realized by distributing the MCTs in such a way that each task has a partner which runs on a different MCP. Thus, the failure of a single MCT results in its functionality being taken over by the "partner" board. The failure of a MCP board results in the switchover of each MCT being carried by that board. The SSNC redundancy is realized at a HW level but in a different manner than within NSP 22. Each unit (e.g., MPU) has a redundant partner. For example, MCPs 28 consist of two MPUs which run micro-synchronously. This same concept applies to AMX, ACCG, ALI-B and LIC. The concept of a system half does not exist within SSNC 30. The redundancy therefore is realized on a per unit basis.

Two independent host interface platform units 32*a* and 32*b* are provided in softswitch controller 12. Each host interface platform 32 handles communication for one side of the system. This is similar to the ICC redundancy scheme. There is no communication for redundancy purposes, but communication between the host interface platforms is needed to handle failure scenarios, where gateways are only connected to one of the host interface platforms.

ATM edge switch 108 is also redundant and supports both planes within the softswitch controller 12.

Access gateway 22 also has redundant features. The LTI retains its redundancy configuration, as implemented for the LSU. Each LTI consists of 2 independent planes that provide all the switching and signaling functions for a single system side. Each plane consists of an LSUC, TSIM and the required number of Message Handlers and AMUX modules. Stable calls are preserved on the failure of a single LTI plane or sub-component. The LTI DIU240 modules are not redundant, but can be controlled by either LTI plane.

ATM edge switch 122 also has redundant features by supporting both independent planes.

V. Other embodiments

Referring to FIG. 10, access gateway 16 can be configured to support an IP network. The IP configuration is similar to the ATM configuration, except the ATM edge switch 108 is replaced by an IP multiplexer 126, ATM edge switch 122 is replaced by an IP multiplexer 124. IP multiplexer 124 provides packetization of the message channels between softswitch controller 12 and access gateway 16 using unframed full T1 over UDP over IP over Ethernet. An IPmux-4 4-port variant is used with either a 10BaseT or 100BaseT Ethernet interface. IP multiplexer 126 perform a complementary function at softswitch controller 12 using an IPmux-16.

With an IP-based access gateway, two IPmux-4s are used with each handling the MCH transport for one of the two planes. At softswitch controller 12, either two or four IPmux-16s will be needed.

In addition, a media gateway 210 is configured differently than media gateway 110. Media gateway functionality included in access gateway 16 is based on the Unisphere Network SMX 2100. Media gateway 210 is a voice over IP gateway unit which converts the voice media streams from the LTI into IP. In addition, media gateway 210 includes 4 DS3 cards (the DXM modules), each supporting 4 DS3s, can be equipped per shelf, along with a 1 backup card (4+1 redundancy), which provides for a total of 10,752 DS0s per media gateway 210.

Media gateway 210 also includes 10 IPM cards per shelf and each supporting 1440 uncompressed channels. These provide the VoIP interworking and the interface to packet network 18, which provides for a total of 14,400 DS0s per media gateway 210.

To support the maximum IP port count in access gateway 16, one (1) media gateway 210 is required, using 2 of the DS3 cards plus 1 backup (2+1 redundancy). This will support the maximum of 5,328 IP trunks on access gateway 16. 5 IPM cards would also be required for those channels with a 5+1 redundancy. Media gateway 210 has call control via H.248.

Referring to FIG. 11, access gateway 16 can also be configured to support a TDM network by interfacing the LTI directly interface with network 18.

The invention is not limited to the specific embodiments described herein. For example, the invention is not limited by the amount of access gateways connected to the softswitch controller nor is the invention limited by the amount of MCPs within each softswitch controller.

Still other embodiments are written within the scope of the claims.

What is claimed is:

1. A call processing system, comprising:
an access gateway including a local switching unit, the access gateway, in operation, providing access to voice signals and data signals; and
a call feature server having a host interface platform configured to connect to the access gateway through a network, the call feature server, in operation, providing call control functionality to the local switching unit, the call feature server configured to provide bearer control signals through a packet network to establish a bearer channel.

2. The system of claim 1, wherein the access gateway comprises a media gateway to convert time division multiplex (TDM) signals to a packet compatible format, the media gateway providing bearer channel transport to the local switching unit.

3. The system of claim 2, wherein the local switching unit comprises:
a access control platform (ACP); and
a remote timeslot interchange (LTI) interfacing the ACP with bearer signals and control signals.

4. The system of claim 3, wherein the local switching unit further comprises:
a access line frame (ALF) interfacing the ACP with bearer signals and control signals.

5. The system of claim 2, wherein the access gateway includes an integrated access platform providing a GR303 interface, the integrated access platform interfacing the ACP with bearer and control signals.

6. The system of claim 1, wherein the host interface platform comprises:
a first subplatform having a first interface processor card and a first T1 card; and
a second subplatform having a second interface processor card and a second T1 card; the
second subplatform redundant to the first subplatform.

7. The system of claim 1, wherein the network comprises a time division multiplex (TDM) network.

8. The system of claim 1, wherein the network comprises the packet network.

9. The system of claim 8, wherein the packet network comprises an asynchronous transfer mode (ATM) network.

10. The system of claim 9, wherein the access gateway comprises a first ATM edge switch connecting the local switching unit to the network to receive control signals from the call feature server, the first ATM edge switch performing circuit emulation of control signals and routing of bearer channels.

11. The system of claim 10 wherein the call feature server comprises a second ATM edge switch connecting the host interface platform to the network, the second ATM edge switch performing circuit emulation of control signals in tandem with the first ATM edge switch.

12. The system of claim 8, wherein the packet network comprises an Internet Protocol (IP) network.

13. The system of claim 12, wherein the access gateway comprises:
a first multiplexer connecting local switching unit to the network to receive control signals from the call feature server, the first multiplexer performing circuit emulation of control signals and routing of bearer channels.

14. The system of claim 13, wherein the call feature server comprises:
a second multiplexer connecting the host interface platform to the network, the multiplexer performing circuit emulation of control signals in tandem with the first multiplexer.

15. The system of claim 1 wherein components of the access gateway are accessible through a web browser.

16. The system of claim 1, further comprising a plurality of access gateways.

17. The system of claim 16, wherein the media gateway provides bearer channel transport to each of the plurality of access gateways.

18. The system of claim 16, wherein each access gateway has a corresponding media gateway.

19. A method of call processing, comprising:
connecting a network to a call feature server having a host interface platform;
connecting the network to an access gateway having a local switching unit;

receiving a request to route a call from the access gateway;
sending a control signal from the call feature server to the local switching unit to route the call; and
sending a bearer channel control signal to establish a bearer channel.

20. The method of claim 19, wherein sending a bearer control signal comprises sending the bearer control signal from the call feature server.

21. The method of claim 19, wherein sending a bearer control signal comprises sending the bearer control signal from the access gateway.

22. The method of claim 19 wherein the network comprises a packet based network.

23. The method of claim 22 wherein the network comprises an ATM network.

24. The method of claim 22 wherein the network comprises an IP network.

25. The method of claim 22 wherein the access gateway comprises:
a media gateway capable of converting a time division multiplex messages to packet-based messages.

26. A call feature server for a call processing system comprising:
a centralized controller to send control signals to a plurality of distributed processors,
a local area network (LAN) to couple the centralized controller to each of the plurality of distributed processors to perform decentralized call processing; and
a host interface platform connecting the LAN to a network to send control signals and bearer signals, the host interface platform configured to interface with a packet network.

27. The call feature server of claim 26, further comprising:
an access gateway connected to the host interface platform via the network.

28. The call feature server of claim 26, wherein the host interface platform comprises:
a first subplatform having a first interface processor card and a first T1 card.

29. The call feature server of claim 28, wherein the host interface platform further comprises:
a second subplatform having a second interface processor card and a second T1 card; the second subplatform redundant to the first subplatform.

30. The call feature server of claim 26, wherein the network comprises a time division multiplex (TDM) network.

31. The call feature server of claim 26, wherein the network comprises an asynchronous transfer mode (ATM) network.

32. The call feature server of claim 31, wherein the access gateway comprises a first ATM edge switch connecting the local switching unit to the network to receive control signals from the call feature server, the first ATM edge switch performing circuit emulation of control signals and routing of bearer channels.

33. The call feature server of claim 32 wherein the call feature server comprises a second ATM edge switch connecting the host interface platform to the network, the second ATM edge switch performing circuit emulation of control signals in tandem with the first ATM edge switch.

34. The call feature server of claim 26, wherein the network is an Internet Protocol (IP) network.

35. The call feature server of claim 34, wherein the access gateway comprises:
a first multiplexer connecting local switching unit to the network to receive control signals from the call feature server, the first multiplexer performing circuit emulation of control signals and routing of bearer channels.

36. The call feature server of claim 35, wherein the call feature server comprises:
a second multiplexer connecting the host interface platform to the network, the multiplexer performing circuit emulation of control signals in tandem with the first multiplexer.

37. A method of call processing, comprising:
receiving a request to route a call; and
sending control signals via a host interface platform through a network to set-up the call; and
sending bearer control signals.

38. The method of claim 37, wherein the network is a packet based network.

39. The method of claim 38, further comprising:
sending control signals to route the call through one or more media gateways.

40. The method of claim 38, further comprising:
emulating a TDM signal through a network.

41. An access gateway for a call processing system, comprising:
a local switching unit to set-up a call;
a media gateway capable of TDM signal and packet message conversion, the media gateway receiving control signals from a network, the media gateway providing bearer control signals to the local switching unit from a call feature server; and
a multiplexer to perform circuit emulation of TDM signals from the network.

42. The gateway of claim 41, wherein in the network comprises an ATM network.

43. The gateway of claim 42, wherein the network comprises an IP network.

44. A method of call processing, comprising:
receiving a request to route a call;
converting time division multiplex (TDM) signals to a packet compatible format;
sending the request via a packet network to a call feature server; and
receiving control signals via the packet network from the call feature server to route the call.

45. The method of claim 44, further comprising:
providing bearer control signals from a media gateway.

46. A call processing architecture, comprising:
a first platform including a call feature server, the call feature server configured to provide bearer control through a packet network; and
a second platform including an access gateway connected to the call feature server via the network, the access gate way including a media gateway providing TDM and packet based conversion;
wherein the first platform and the second platform each are configured to support an IP network, an ATM network and a TDM network.

47. The call processing architecture of claim 46, further comprising:
a plurality of access gateways.

48. The call processing architecture of claim 47, wherein the media gateway provides to each of plurality of access gateways, bear channel transport.

49. The call processing architecture of claim 47, wherein each of the plurality of access gateways has a media gateway interfacing to the network.

* * * * *